H. H. BOUSON.
AUTOMOBILE TORPEDO.
APPLICATION FILED JAN. 26, 1917.
1,304,255.
Patented May 20, 1919.
3 SHEETS—SHEET 3.
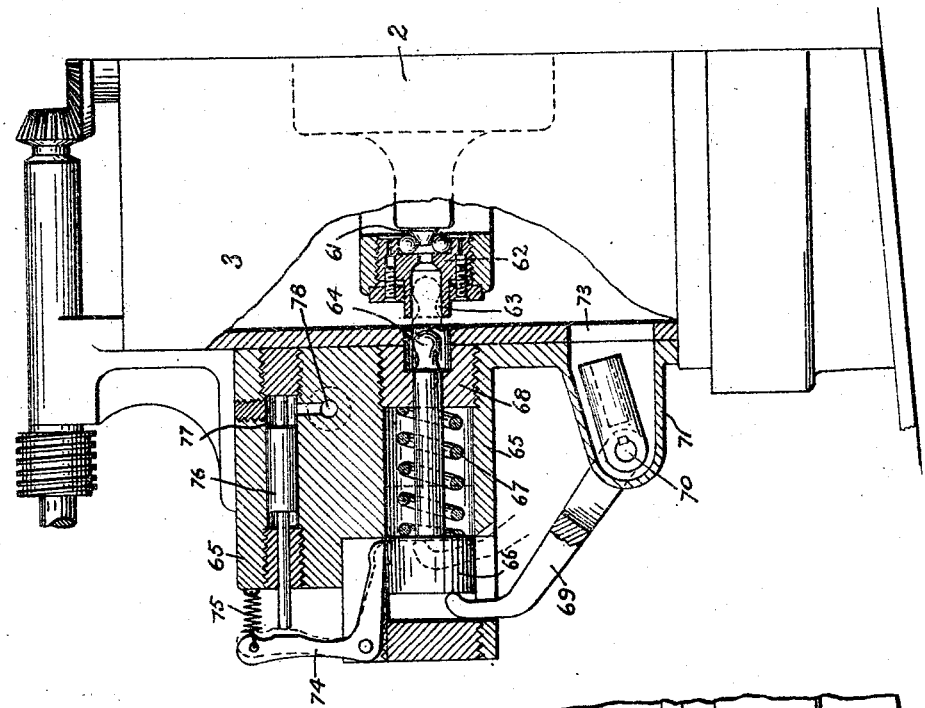
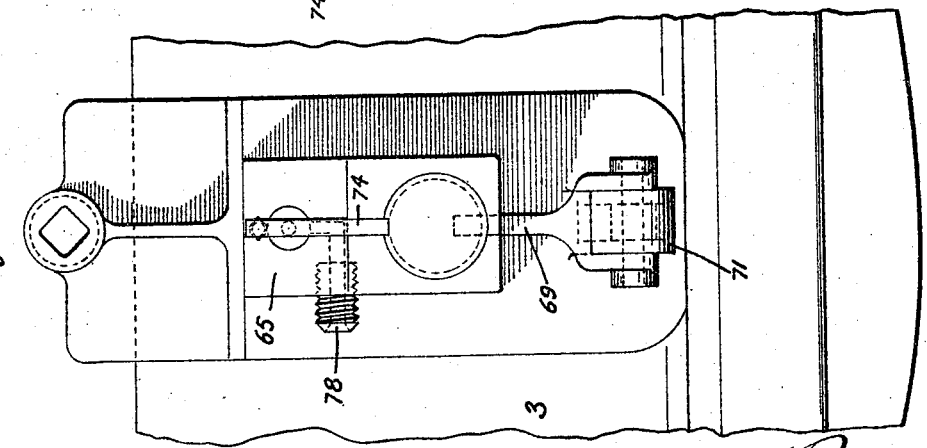
Herbert H. Bouson
Inventor.
Witnesses.

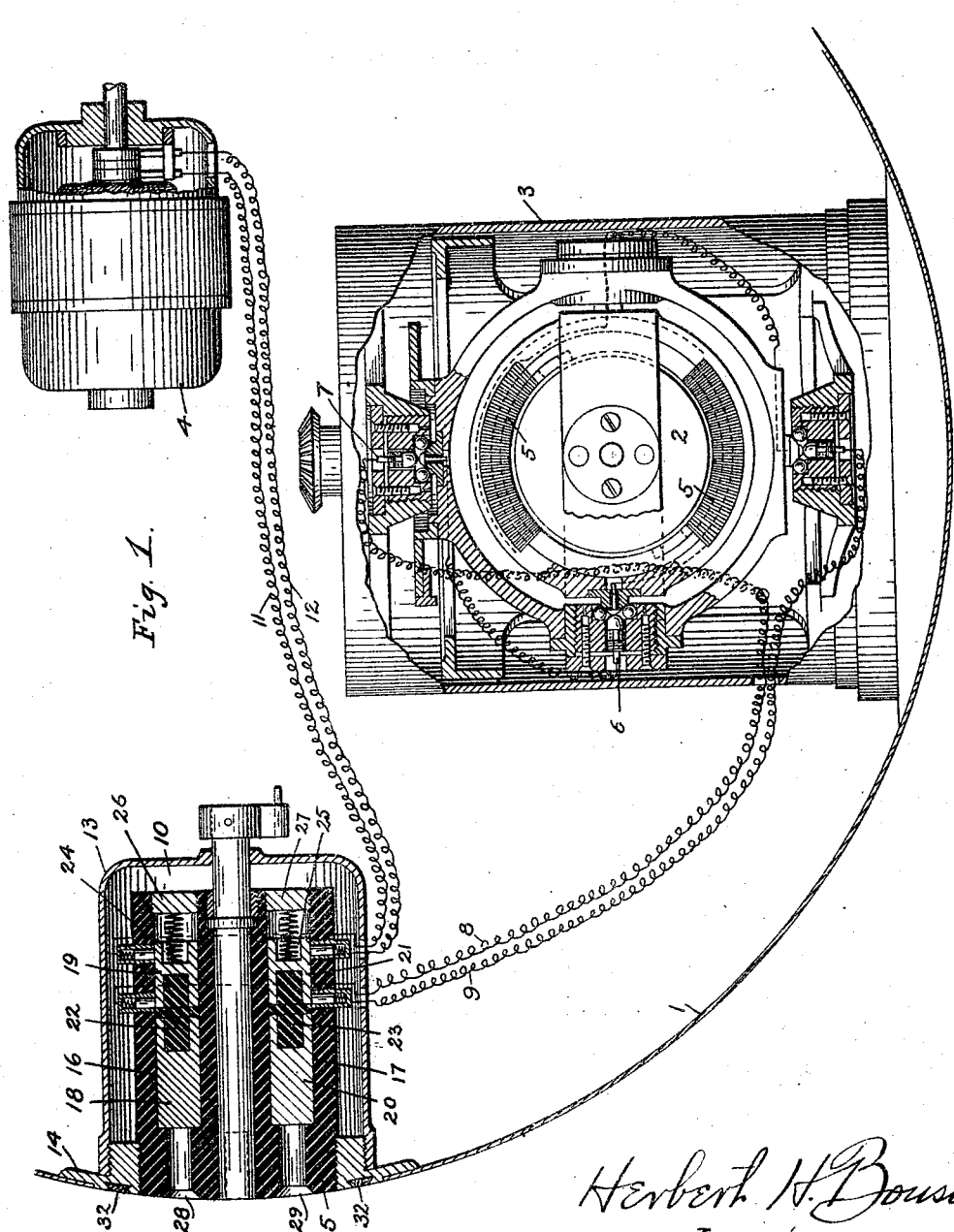

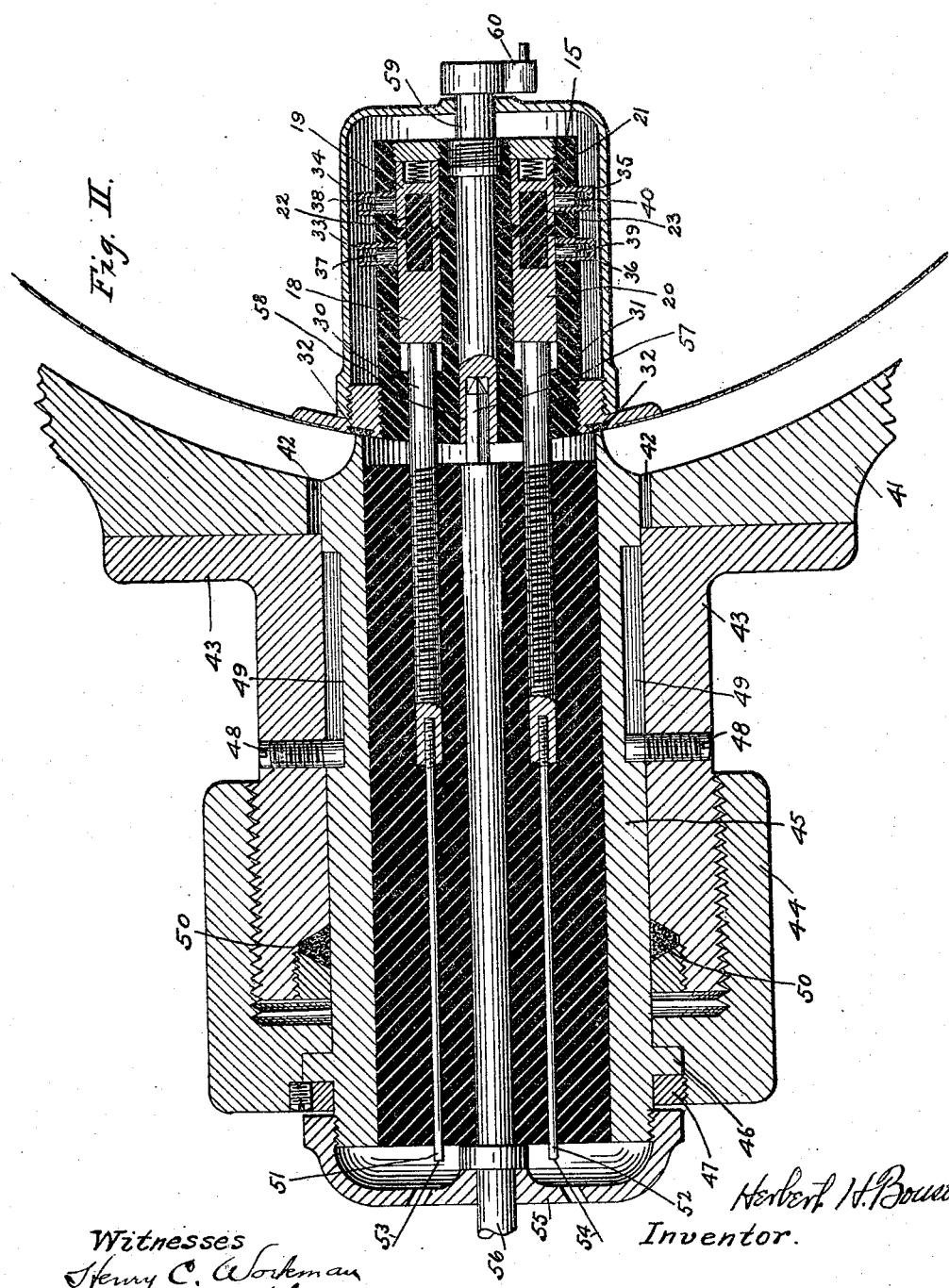

UNITED STATES PATENT OFFICE.

HERBERT H. BOUSON, OF THE UNITED STATES NAVY, ASSIGNOR TO THE UNITED STATES OF AMERICA.

AUTOMOBILE TORPEDO.

1,304,255. Specification of Letters Patent. Patented May 20, 1919.

Application filed January 26, 1917. Serial No. 144,795.

*To all whom it may concern:*

Be it known that I, HERBERT H. BOUSON, a citizen of the United States, an officer of the United States Navy, and a resident of Philadelphia, Pennsylvania, have invented new and useful Improvements in Automobile Torpedoes; and in order that others skilled in the art may understand and practise my invention I give the following description and specification thereof.

My invention relates to torpedoes carrying their own motive power and generally known as automobile torpedoes. As is well known, such torpedoes have their steering mechanism controlled by a gyroscope, rotating at a sufficient speed to maintain a directive force for controlling the steering mechanism of the torpedo. (For convenience the term gyro will be employed instead of "gyroscope" in the following specification and claims.)

Prior to my invention the usual practice has been to spin the gyro at the moment of discharging the torpedo by a powerful and momentary impulse from the compressed-air motive power of the torpedo, this impulse being applied through a turbine or other spinning device connected with the gyro. This initial momentary impulse was depended upon to give the gyro sufficient speed to enable it to maintain, by its momentum, a rate of speed sufficient to maintain its directive force throughout the run of the torpedo. As the minimum rate of speed of the gyro for maintaining its directive force is about 4000 R. P. M. it will be apparent that the initial impulse required will be such as will start the gyro at a considerably higher rate of speed, since owing to air-resistance, friction, etc., the gyro will constantly drop in speed. In practice, the gyro is given a sufficient starting impulse to start it at about 18,000 R. P. M., this rate constantly decreasing until toward the end of the run of the torpedo the gyro speed has fallen to or below the minimum rate before mentioned. Developments in the art of torpedo engines and motive power have now increased the range of torpedoes so that this drop in speed of the gyro has become a serious defect. In another application for patent I have described means for positively driving the gyro at a practically constant speed throughout the run of the torpedo, and from a source of power within the torpedo. The object of my present invention is, broadly, to provide means for starting the gyro from a source of power outside the torpedo and for automatically disconnecting the gyro from the outside source of power and transferring it to driving connection with the source of power inside the torpedo.

Various important improvements and advantages in torpedo construction and operation are secured by my invention, as broadly stated. These form other objects of the present invention and will more specifically appear in the following specification. Among them are included the elimination of the gyro-starting mechanism from the torpedo itself with resulting simplification of the torpedo construction; a simplification of the gyro-unlocking mechanism heretofore associated with the starting mechanism; the avoidance of the shock to the delicate gyro mechanism through elimination of the heavy starting impulse; and the transfer of the gyro to its driving connections within the torpedo without disturbance of the gyro, and without loss of gyro speed. Other objects and advantages of my invention will appear in the following detailed description thereof.

In the accompanying drawings I have shown an example of my invention, it being understood that the particular mechanism shown is by way of illustration and not limitation. Referring to said drawings, Figure I is a partial transverse cross-sectional view of a torpedo, parts being shown in elevation, and other parts being broken away to more clearly illustrate the features thereof. Fig. II is a cross-sectional view showing part of the construction illustrated in Fig. I, together with other parts outside the torpedo coöperating therewith. Fig. III is a detailed view, parts being shown in section, of a gyro-locking and releasing mechanism. Fig. IV is an end view of the mechanism shown in Fig. III looking from the left.

Referring to Fig. I of the drawings, 1 indicates the body or shell of the torpedo, inside of which is suitably mounted the gyro 2 contained in a pot or housing 3. The detailed construction of the gyro need not be particularly described as it is well understood by those skilled in the art. It will be sufficient to state that the gyro-wheel 2 is mounted in suitable gimbal rings so as to have the necessary freedom of movement in order to enable it to exert its controlling effect upon the steering mechanism of the torpedo and at the same time to be free from deviations likely to occur from outside influences. The gyro shown in the drawings is in the form of a gyro-motor, the inner gimbal ring of which carries field coils 5 and the gyro-wheel 2 forming the rotor.

The gyro is electrically driven from a dynamo 4, suitably mounted within the torpedo and actuated by suitable driving connections (not shown) from the main engines or from an intermediate part, or from the motive power of the torpedo. The relative position of the dynamo 4 is not intended to be shown in the drawing, but only the manner of its connections with the gyro. As the particular construction of the gyro enabling it to be driven by the dynamo, as well as the particular description of the dynamo itself and its driving connections with the main engines, or otherwise, do not in themselves form a part of the present invention, a detailed description thereof is unnecessary to the understanding of the present invention. It will be sufficient to point out that the field windings 5, 5 carried by the inner gimbal ring of the gyro are connected through axially-mounted contact pins 6 and 7 in the pivots and bearings of the inner and outer gimbal rings, respectively, with conductors 8 and 9 that lead to and through a switch or shifting device 10 and thence by conductors 11 and 12 to the dynamo 4.

While electricity is the most convenient and suitable form of energy for driving the gyro, either from inside or outside the torpedo, mechanical energy may be employed by substituting suitable mechanical connections without departing from the broad features of my invention.

For carrying out my present invention in enabling the gyro to be driven either from a source of power outside the torpedo or a source of power inside the torpedo, and to enable the gyro being shifted from one to the other, I provide a source of power transferring device 10. In the shifting or example shown this consists of a casing 13 having screw-threaded connection with the flanged collar 14, suitably secured to the inside wall of the torpedo shell 1. The collar 14 surrounds an opening in the shell of the torpedo through which the mechanism inclosed by the casing 13 is exposed to the exterior of the torpedo. The outer conformation of this exposed portion of said mechanism corresponds to the conformation of the body of the torpedo as will appear from the drawings. The collar 14 is interiorly threaded to engage with a cylindrical block of insulating material 15, whereby the latter is held in place by the collar 14. The insulating block 15 is bored longitudinally to form chambers or recesses 16 and 17 in which are slidably mounted conducting pieces 18, 19, and 20, 21. Interposed between the conducting pieces 18 and 19 is an insulating block 22, and a similar insulating block 23 is interposed between the conducting pieces 20 and 21. The ends of the conducting pieces 19 and 20 are recessed to provide space for springs 24 and 25, respectively; these springs bearing at one end upon their respective conducting pieces and at their other ends bearing upon insulating caps 26 and 27 screwed into the inner ends of the recesses 16 and 17, respectively. The recesses 16 and 17 extend through said block 15 to the outside of the torpedo, the outer portions thereof being shown as of reduced diameter to form sockets 28 and 29, respectively, to receive contact plungers 30 and 31 (see Fig. II). The insulating block 15 is further provided with a gasket 32 on its outer surface near its periphery to form a packed joint with the member, hereinafter described, carrying the contact plungers 30 and 31. The insulating block 15 is bored radially to receive bushings 33, 34 and 35, 36, in which are respectively mounted contact pins 37, 38 and 39, 40. These contact pins are so arranged, respectively, that in one position of the conducting pieces 18, 19 and 20, 21 both pins 37 and 38 make electrical contact with conducting piece 19 and both contact pins 39 and 40 make electrical contact with conducting piece 21, as shown in Fig. I. Also, in the other position of the said conducting pieces 18, 19 and 20, 21, pins 37 and 39 make contact, respectively, with conducting pieces 18 and 20, while pins 38 and 40 make contact, respectively, with conducting pieces 19 and 21— the conducting pieces 18 and 19 being electrically separated by the interposed insulating piece 22, and the conducting pieces 20 and 21 being similarly electrically separated by the insulating piece 23. The contact pins 37, 38, 39 and 40 are connected with the dynamo 4 and gyro-motor as follows: Conductor 11 leading from one brush of dynamo 4, passes in through a suitable aperture in the casing 13 and around the exterior of the insulating block 15 to pin 38, from thence to the conducting piece 19, then through the conducting piece to contact pin 37, thence around the exterior of the insulating block 15 and out through the casing 13 to contact pin 7 in the gimbal ring pivots of the gyro, through the gyro and its field windings 5 to the lower gimbal ring pivots, thence to contact pin 39 through conducting piece 21, then to contact pin 40 and thence back through conductor 12 to the other brush of the dynamo 4. It will thus be seen that in the position of the parts as shown in Fig. I the dynamo 4 is connected through the shifting device 10 to the gyro-motor so that the gyro will be driven at a constant speed by driving mechanism within the torpedo.

In order that the gyro may also be initially driven or spun by a source of power outside of the gyro while the torpedo is still in the discharge tube or elsewhere, preparatory to its discharge, I provide the following mechanism shown in Fig. II of the drawings, wherein by way of example, 41 shows a portion of the torpedo tube. This tube is provided with the lateral opening 42 surrounded by a flanged collar 43, the end portion of which is screw-threaded, as shown, to engage with an adjusting sleeve 44. Preferably, the screw-threaded engagement between the adjusting sleeve 44 and the collar 43 is of the interrupted screw-thread type, similar to that on the breech closures of guns, to enable said collar to be moved in an axial direction, as will more fully appear. Sleeve 44 has also engagement with a plug 45, slidably mounted within said collar 43, by means of a flange 46 formed on the plug, said sleeve being recessed to receive said flange 46 and provided with a ring 47 at the rear of the flange 46. This ring 47 also provides means for assembling or disassembling the parts. The plug 45 has limited longitudinal movement in the sleeve 43, studs 48 being provided that engage the longitudinal key-ways 49, limiting the longitudinal movement of plug 45 by the length of said ways, and also maintaining the plug in definite radial position. A packing ring and gland is provided at 50 to make water-tight joint between the plug 45 and its sleeve 43.

The core of plug 45 is of insulating material bored to receive plungers 30 and 31, and leads 51 and 52 leading therefrom to the outer end of the plug where they are connected with an outside source of current by flexible conductors 53, 54, the latter passing through apertures in a cap 55. Also passing through plug 45, and axially thereof, is a shaft 56, the inner end 57 of which is angular and projects into a mating angular socket 58 in the end of a shaft 59, extending through the insulating block 15 and through casing 13 inside the torpedo. The projecting end of shaft 59 carries a cam and pin 60 that engages with adjusting mechanism (not shown) within the torpedo for adjusting the angle of the steering mechanism to give the torpedo a course inclined to the line of fire. By this means this mechanism may be adjusted or set by rotating shaft 56, which extends through plug 45 and cap 55, and has its outer end provided with a hand wheel or crank and a measuring device (not shown) for that purpose.

As before indicated my invention of providing for initially spinning or starting the gyro by a source of power outside the torpedo also enables a simplification and improvement of the gyro-locking and unlocking mechanism. Heretofore, where gyros have been initially spun or started by the compressed air or other motive power inside the torpedo, an automatic unlocking means to unlock the gyro after the initial spinning impulse had been imparted to it, has formed a part of such initial spinning mechanism. Such unlocking means and the proper timing of its action has necessarily involved complication of parts. By dispensing with starting mechanism inside the torpedo I am enabled to provide a simpler and more reliable unlocking means. These means are illustrated in Figs. III and IV, wherein the gyro is partially indicated in broken lines at 2, one of its pivots 61 being shown with its bearings in the inner gimbal ring 62. In said bearings is provided an axially-positioned socket 63 to receive the locking pin 64. This pin is carried in a boss 65 formed on or secured to the side of the gyro housing or pot 3. This pin has its outer end 66 enlarged, and a spring 67 is provided, in a recess formed to receive it, one end of said spring bearing against the enlarged end 66 of the locking pin while its other end bears against a fixed abutment 68 through which the pin passes. This spring 67 tends to hold the locking pin 64 in the unlocked position as seen in Fig. III.

Against the outer face of the enlarged end 66 of the locking pin bears one arm 69 of a bell-crank lever, said lever being pivoted at 70 in a housing 71 that may form a part of the boss 65 or be otherwise secured to the gyro pot 3. The other arm 72 of the bell-crank is arranged within housing 71 to come opposite an opening 73 in the wall of the gyro housing 3, through which it may be engaged by a tool (inserted through bottom of gyro pot 3) to cause arm 69 to push the locking pin forward into locking position (illustrated in broken lines Fig. III). To retain the locking pin in this position a latch 74 is provided, the forward end of which will, by the action of its spring 75, drop behind the enlarged end 66 of the locking pin. At the same time latch 74 pushes forward a piston 76 mounted in a bore 77 in boss 65. Communicating with the forward end of said bore is an air duct 78 that is connected to the starting valve (not shown) of the torpedo.

The operation of this locking mechanism will be apparent from the foregoing description and in brief is as follows: By engaging a tool with the short arm 72 of the bell-crank the locking pin is thrust forward against the action of its spring 67 until it enters the locking socket 63 of the inner gimbal ring of the gyro, thus locking the gimbal rings rigidly to fix the gyro in a definite plane of rotation or direction prior to and at the time of launching the torpedo. At the same time latch 74 will have been moved so that its forward end drops behind the enlarged head 66 of the locking pin thus retaining the latter in its locked position; this movement of the latch 74 also will have moved forward the piston 76. Upon the discharge of the torpedo by action of its starting lever and mechanism controlled thereby, air from the compressed air flask is admitted to the duct 78 and bore 77, thereby forcing piston 76 backward, lifting the latch 74 and allowing spring 67 to throw the locking pin 64 out of locking engagement with the gyro, thus leaving the gyro free to exert its directive force to control the steering mechanism of the torpedo.

The operation and control of the gyro by the starting and driving means before described is as follows: Assuming the torpedo 1 has been inserted in its discharging tube 41, the gyro having previously been inserted in its place in housing or pot 3 and the locking pin entered into its socket 63 in the inner gimbal ring of the gyro by the mechanism just described, plug 45 will be opposite the transfer mechanism 10. The adjusting sleeve 44 is then manipulated, as by giving it a turn and thrust, thereby thrusting the plungers 30 and 31 into the sockets 28 and 29, respectively, and pushing the conducting pieces 18, 19 and 20, 21 inwardly into the position shown in Fig. II. At the same time shaft 56 enters socket 58 so that the desired setting or adjustment of the angle-gear of the steering mechanism may be made by means of that shaft and its connections with the cam 60, as before explained. In this position of the parts the conductors 51 and 52 being connected with the ship's dynamo or other outside source of current, the current enters through one of these conductors 51, through the plunger 30, through conducting piece 18 to contact pin 37, thence around inside of casing 13 through conductor 8 and the gimbal ring contacts to the field windings 5, 5 carried by the inner gimbal ring, and thence back through conductor 9, through the corresponding path to outside conductor 52 to the outside source of power. The gyro is thus started or spun and this spinning may be at any desired rate, but is preferably at a rate somewhat in excess of the minimum rate required for the gyro to exert its directive force, though considerably lower than the rate required for momentum-driven gyros. This initial spinning from the outside source of power may be maintained as long as it is desired, or until the proper moment arrives for discharging the torpedo. It will thus be seen that my invention overcomes the objection heretofore present of imparting a sudden and powerful initial spinning force momentarily to the gyro that is many times in excess of that required to drive the gyro at a speed sufficient to exert its directive force; since by the invention herein set forth the starting impulse may be spread over a considerable interval of time relieving the delicate gyro mechanism from the shock of a sudden application of excessive force.

When the torpedo is about to be discharged the adjusting sleeve 44 is turned in the opposite direction and retracted, whereupon the plug 45 with the plungers 30, 31 and shaft 56 will be withdrawn from the torpedo and the torpedo will be free to be discharged from the tube. Upon the withdrawal of plug 45 as described, springs 24 and 25 will throw conducting pieces 18, 19 and 20, 21 backward to the position shown in Fig. I, thereby making a circuit from the dynamo 4 inside the torpedo, through conductor 11, around inside of casing 13 to contact pin 38, conducting piece 19, contact pin 37, around inside of casing 13 through conductor 8 to the field windings 5, 5 of the gyro-motor and back through conductor 9 to contact pin 39, conducting piece 21, contact pin 40, conductor 12 back to dynamo 4, thereby connecting the gyro-motor with the dynamo inside the torpedo. This dynamo being driven at constant speed by the motive power of the torpedo, or other suitable driving connections from said motive power, the gyro is thus now driven from a source of power within the torpedo.

It will be understood that as soon as the plug 45 has been withdrawn in the manner described the torpedo will immediately be discharged whereupon by action of its starting lever, as before explained, the locking mechanism shown in Figs. III and IV will be actuated to unlock the gyro. During this time the main engines of the torpedo are building up to their maximum desired speed and the gyro is being correspondingly accelerated until it reaches a constant relative speed corresponding to the maximum speed of the torpedo.

As it has heretofore been the practice to provide means leading from outside to the interior of the torpedo, such as shafts 56 and 58 for setting the angle gear of the steering mechanism, I have utilized this same point of outside connection for leading into the interior of the torpedo the power for initially spinning the gyro; and by combining the outside power connections with those for adjusting the angle-gear I am enabled to avoid a plurality of openings in the torpedo and discharge tube. And further, I have also utilized the same means required for inserting and withdrawing the angle-gear adjusting device (shaft 56) for also inserting and withdrawing the outside power connections. I thereby do not change the existing method of preparing the torpedo for discharge or add complication to the aiming and discharging devices.

It will be obvious that various modifications in the several parts of the mechanism shown and described may be made by those skilled in the art without departing from the invention, and it is to be understood that my invention is not restricted to the precise form and character of the various details and parts shown.

What I claim is:

1. In torpedo apparatus the combination of an insert plug for inserting into the torpedo from outside thereof, power connections from an outside source of power carried by said plug for driving the gyro, means carried by the torpedo for driving the gyro, a transferring device carried by the torpedo for transferring the gyro from the last-mentioned driving means to the outside driving means, said transferring device actuated by the insertion and withdrawal of said plug.

2. In torpedo apparatus the combination with the gyro carried by the torpedo of electrical driving means carried by the torpedo for driving the gyro, electrical driving means exterior of the torpedo for driving the gyro, an insert plug having connections from the exterior gyro-driving means, a switch-device, and means for actuating said switch device by the insertion and withdrawal of the plug for transferring the gyro from one of its driving means to the other.

3. In torpedo apparatus the combination of an insert plug for inserting into the torpedo from outside thereof, angle-fire adjusting means carried by said plug, connections from an outside source of power for driving the gyro of the torpedo also carried by said plug, means carried by the torpedo for driving the gyro, and a transferring device for transferring the gyro from one of its said driving means to the other, said transferring device actuated by the insertion and withdrawal of said plug.

4. In an automobile torpedo, the combination with the gyro of electrical means for driving the same, a casing within the torpedo and surrounding an opening in the torpedo wall, a switch device and an angle-fire adjusting means carried within said casing and accessible from the exterior of the torpedo through said aperture, said switch device interposed in the connections between the gyro and its driving means, and a device exterior of the torpedo insertible in said aperture for operating said switch-device and also the angle-fire adjusting means.

5. In torpedo apparatus, means for initially spinning the gyro while the torpedo is in the discharging tube preparatory to its discharge, said means comprising in combination a plug slidably mounted in the wall of the torpedo tube to be projected through an aperture therein, spinning connections from an exterior source of power carried by said plug, a switch-device mounted within the torpedo and operatively exposed to the exterior thereof, said switch-device registering with the aperture in the torpedo-tube, means within the torpedo and connected to the gyro for driving the latter throughout the run of the torpedo, said switch-device controlling the connections between the gyro and both its driving means and spinning means, and means carried by said plug for operating said switch.

In witness whereof, I have hereunto signed my name in the presence of two subscribing witnesses.

HERBERT H. BOUSON.

Witnesses:
A. G. MILLER,
HENRY C. WORKMAN.

Copies of this patent may be obtained for five cents each, by addressing the "Commissioner of Patents, Washington, D. C."